United States Patent [19]
Sohda et al.

[11] Patent Number: 5,935,359
[45] Date of Patent: Aug. 10, 1999

[54] PROCESS FOR PRODUCING CARBONACEOUS PREFORM

[75] Inventors: Yoshio Sohda; Takefumi Kohno; Mitsuhiro Ishii; Masakazu Hiro, all of Yokohama, Japan

[73] Assignee: Nippon Oil Company, Limited, Tokyo, Japan

[21] Appl. No.: 08/843,085

[22] Filed: Apr. 25, 1997

[30] Foreign Application Priority Data

Apr. 26, 1996 [JP] Japan ..................................... 8-106574

[51] Int. Cl.⁶ ............................. B32B 31/26; C01B 31/00
[52] U.S. Cl. .................... 156/89.26; 264/29.1; 264/29.3; 264/29.6
[58] Field of Search ................................ 156/89.26, 155, 156/305; 264/29.1, 29.2, 29.5, 29.6, 29.3; 423/447.1, 447.2

[56] References Cited

U.S. PATENT DOCUMENTS

| | | |
|---|---|---|
| 3,991,248 | 11/1976 | Bauer . |
| 4,745,008 | 5/1988 | Plotzker et al. .................... 264/29.5 X |
| 4,849,200 | 7/1989 | Uemura et al. ..................... 264/29.2 X |
| 4,986,943 | 1/1991 | Shaeffer et al. ........................ 264/29.1 |
| 5,055,243 | 10/1991 | Takahashi ............................... 264/29.1 |
| 5,057,254 | 10/1991 | Sohda et al. ........................... 264/29.2 |
| 5,061,414 | 10/1991 | Engle ..................................... 264/29.5 |
| 5,114,635 | 5/1992 | Sohda et al. ........................... 264/29.2 |
| 5,181,979 | 1/1993 | Uemura et al. .................... 264/29.5 X |
| 5,192,471 | 3/1993 | Uemura et al. ........................ 264/29.5 |
| 5,217,657 | 6/1993 | Engle ..................................... 263/29.5 |
| 5,246,639 | 9/1993 | Takabatake ............................ 264/29.5 |
| 5,382,392 | 1/1995 | Prevorsek et al. ..................... 264/29.5 |
| 5,433,937 | 7/1995 | Sohda et al. ....................... 264/29.2 X |
| 5,525,558 | 6/1996 | Niwa et al. . |
| 5,733,484 | 3/1998 | Uchida et al. ......................... 264/29.1 |

FOREIGN PATENT DOCUMENTS 6-1658  1/1994  Japan .

*Primary Examiner*—Curtis Mayes
*Attorney, Agent, or Firm*—Dilworth & Barrese

[57] ABSTRACT

A carbonaceous preform, which is free from such drawbacks as delamination and is superior in formability and mass productivity, can be obtained by a process comprising the steps of fixing a laminate of stacked carbon fibers with a fixing jig in the absence of a binder, impregnating the thus-fixed laminate with a molten carbonaceous pitch, and carbonizing the impregnated laminate in a non-oxidative gas atmosphere.

12 Claims, No Drawings

PROCESS FOR PRODUCING CARBONACEOUS PREFORM

BACKGROUND OF THE INVENTION

1. Field of the Invention

The present invention relates to a process for producing a carbonaceous preform and particularly to a laminated carbon fiber reinforced carbonaceous composite preform, namely, a so-called carbon/carbon composite preform.

2. Prior Art

A conventional process for producing a carbon fiber reinforced carbonaceous composite preform comprises the steps of producing a reinforcing carbon fiber or a carbonaceous preform by adding a binder thereto and densifying the foregoing by means of a carbonaceous matrix.

The densification in the manufacturing procedure of the carbon fiber reinforced carbonaceous composite preform is carried out by any one of the three methods, namely, a method wherein a thermosetting resin is used, a method wherein a thermoplastic substance, such as a pitch, is used and a method wherein a CVD is utilized.

A carbon fiber reinforced carbonaceous composite preform, which is prepared by use of a thermosetting binder such as a phenolic resin, is associated with drawbacks that a delamination tends to occur because a contraction of volume takes place during carbonization and that the obtained composite preform is inferior in thermal conductivity and strength.

A carbon fiber reinforced carbonaceous composite preform, which is prepared by use of a pitch-based matrix in order to avoid the above-mentioned drawbacks, is associated with a drawback that a delamination tends to occur because a volume expansion takes place during carbonization due to foaming of the pitch-based matrix, which is not thermally curable, thereby presenting an impediment to the formability and mass production.

For example, JP4-76342B discloses a process for producing a carbonaceous preform by carbonizing a matrix, which utilizes a carbonaceous pitch as a starting material, and a carbon fiber under uniaxial pressing.

Although this process provides a carbonaceous preform excellent in such formability as flatness and dimensional accuracy, the remaining problem has been that the foaming of pitch during the carbonizing treatment seriously contaminates the inside of the carbonizing oven to an extent that the maintenance work is so often required that a mass production becomes impossible. In addition, even if the carbonizing condition is optimized to suppress the foaming of pitch to a minimum, it has been impossible to completely prevent the delamination of the obtained preform.

Further, Hot Isostatic Pressing (HIP), as a method for solving the problem of gas generation from the pitch during carbonization, is described, for example, in JP5-4945B.

Although the present inventors have carried out the HIP treatment in accordance with the above-mentioned description by placing carbon fiber fabrics and pitch in a vessel for the treatment, a satisfactory preform could not be obtained because the insufficient bonding between the fabrics caused insufficient formability and poor shape retainability.

Furthermore, JP3-52426B discloses the preparation of a carbon fiber reinforced carbonaceous composite preform by a process comprising the steps of preforming a carbonaceous material, which consists of a carbon fiber, a pitch matrix and a carbonaceous powder, by a complicated treatment, fixing the obtained preform by a fixing means comprising stainless steel plates and densifying the preform, characterized in that the densification does not cause expansion and delamination.

However, the drawbacks of this process are that the manufacturing procedure is complicated because the procedure consists essentially of laminating a matrix powder and a carbon fiber fabric alternately, uniaxially pressing, fixing by a fixing means and carbonizing the laminate and that the delamination in the preparation of the carbonaceous preform cannot be completely prevented.

Meanwhile, according to JP5-306180A or JP55-51769A, a carbon fiber reinforced carbonaceous composite preform can be obtained by a process comprising the steps of press-fixing a carbon fiber felt to a desired thickness or shape by use of jigs made from graphite or ceramics and placing the thus-fixed felt in a vacuum oven to carry out a CVD treatment, characterized in that the carbon fiber reinforced carbonaceous composite preform can be obtained by a process which does not use a conventional binder or hot pressing.

However, the problem of the CVD process is, for example, that the procedural steps are complicated and the strength of the carbon fiber is caused to diminish, because a long time period is generally required for the densifying treatment although such phenomena as foaming and expansion of pitch are eliminated, because frequent surface treatments need to be performed during the densification in order to minimize the formation of closed voids as the densification proceeds and because a surface treatment of a carbon fiber with sand paper or the like is necessary at the time of laminating operation.

OBJECT OF THE INVENTION

The object of the present invention is to overcome the above-mentioned drawbacks of the prior art and to provide a simple process for producing a carbonaceous preform, which is free from such drawbacks as delamination and which is superior in dimensional accuracy and mass productivity, by use of a carbonaceous pitch as a matrix.

SUMMARY OF THE INVENTION

The present invention relates to a process for producing a carbonaceous preform, comprising the steps of fixing a laminate of carbon fibers by use of a fixing jig in the absence of a binder, impregnating the thus-fixed laminate of carbon fibers with a molten carbonaceous pitch and carbonizing the impregnated carbon fiber in a non-oxidative gas atmosphere.

PREFERRED EMBODIMENTS OF THE INVENTION

Although a pitch-based carbon fiber, a polyacrylonitrile-based carbon fiber or a rayon-based carbon fiber is normally used as a carbon fiber in the present invention, a precursor of such a carbon fiber can also be used.

The "pitch-based precursor fiber" as referred to herein indicates a spun fiber, an infusibilized fiber obtained by an infusibilizing treatment thereof or a pre-carbonized fiber obtained by a pre-carbonizing treatment thereof The "carbon fiber" as referred to herein indicates a fiber obtained by a carbonizing or graphitizing treatment of the above-mentioned infusibilized fiber or pre-carbonized fiber.

Although the treating temperatures vary depending on individual processes, usually, an infusibilizing or flame-proofing treatment is effected at a temperature in the range of 200 to 450° C. in an oxidative gas atmosphere, a pre-carbonizing treatment is effected at a temperature in the range of 400 to 1,000° C. in a non-oxidative gas atmosphere, a carbonizing treatment is effected at a temperature in the range of 1,000 to 1,500° C. in a non-oxidative gas atmosphere, and a graphitizing treatment is effected at a temperature in the range of 2,000 to 3,000° C. in a non-oxidative gas atmosphere.

A pitch-based carbon fiber having an elastic modulus in the range of 100 to 700 GPa is preferred in the present invention.

Preferably, the carbon fiber is a continuous fiber and is utilized in the form of a cloth, such as a two-dimensional or three-dimensional fabric, in the present invention.

If the carbon fiber is used in the form of a yarn, the yarn consists of 200–320,000 filaments, preferably 500–12,000 filaments and more preferably 1,000–6,000 filaments.

When using a carbon cloth, usually, a plurality of sheets thereof, for example 10–500 sheets, are laminated together, preferably in such a manner that the fiber orientation of one sheet is different from that of any adjacent sheets.

More concretely, when producing a carbon fiber preform to be used as an article such as a rotating member, it is preferred that fabrics, each having longitudinal filaments and transverse filaments interwoven at 0°/90°, be laminated so that an in-plane pseudo-isotropy is achieved.

The laminating procedure in this manner minimizes the radial difference in mechanical and thermal properties in almost every direction.

Where a carbon fiber preform, which will be used as an article such as a high-speed rotating member, is produced, it is preferred that the carbon filaments be spirally woven.

A fabric, which is made by spirally weaving carbon filaments, is selectively oriented in a radial and circumferential directions and has a property agreeable to the stress to be generated by rotation. If such fabrics are laminated according to the method of the present invention, the resulting product can further minimize the radial difference in mechanical and thermal properties in almost every direction.

Where an anisotropic carbon fiber preform is desired, it is preferred to orient carbon filaments in a single direction or to employ a fabric in which the proportions of longitudinal filaments and transverse filaments are not the same.

In the above-described manner, a laminate, which comprises a plurality of carbon fiber layers, is formed. In principle, this laminate has not undergone a needle-punching treatment and it contains no binder.

In the present invention, a laminate of carbon fibers is fixed by use of a jig in the absence of a binder in the above-described manner.

The "binder" as referred to herein indicates a thermoplastic resin, such as polyethylene, an ethylene/vinyl acetate copolymer or the like, a thermosetting resin, such as an epoxy resin, a phenolic resin, a furan resin or the like, as well as a resin, such as pitch, having an adhesiveness to carbon fibers. The "carbon fiber in which a binder is present" as referred to herein indicates a prepreg and the like.

In the present invention, preferably, the pitch as a matrix is not mixed with a filler.

Examples of the filler include carbon powder, coke powder and carbon black.

In the present invention, the kind of the jig is not specially limited, insofar as it is a fixing means capable of fixing a laminate of carbon fibers in such a manner that the laminate is pinched from both sides of laminating direction, i.e., from both sides in the direction of thickness.

Although employable materials for the jig include stainless steel, graphite, carbon fiber reinforced carbonaceous composites and the like, each of which is resistant to a subsequent treatment, a stainless steel jig is preferred, because a carbonaceous jig may be integrated with the pitch carbon during the carbonizing treatment to an extent that the re-use of the carbonaceous jig becomes impossible.

Usually, a jig as a fixing means comprises two plate-like members, each of which has a surface conforming to the shape of the desired formed article, and members, such as bolts and nuts, which are capable of fixing the plate-like members to each other with a predetermined space therebetween. In the case where the desired formed article is a plate, the inner surface of each of the plate-like members is flat.

In the case where the desired formed article is a cylinder, the inner surface of the outer plate-like member is a cylinder and the outer surface of the inner plate-like member is correspondingly a cylinder.

Where a metal plate, such as a stainless steel, is used as the above-mentioned plate-like member, the thickness is determined according to the volume content of the carbon fibers in the resulting carbonaceous preform. That is, if the thickness of the metal plate is t (mm) and the desired volume content of the carbon fibers in the resulting carbonaceous preform is Vf (%), the values of t and Vf are determined so that the product (t×Vf) is usually in the range of 5 to 2,400, preferably 10 to 1,500 and more preferably 50 to 600.

In addition, a metal plate, which has a thickness in the above-mentioned range and is perforated, is suitably used. In this case, the diameter of the hole is usually in the range of 1 to 600 mm, preferably 3 to 300 mm and more preferably 5 to 200 mm. The numerical aperture is usually in the range of 10 to 80%, preferably 10 to 60% and more preferably 10 to 40%, which is determined at will insofar as the mechanical strength inherent to the plate is not significantly impaired.

Further, a material, which is capable of fixing the laminate only until the expansion in volume of the pitch during the carbonization practically ceases, can also be employed as a material of the jig and is exemplified by paper, wood and the like.

Furthermore, if necessary, a plate, which has a thickness of 0–20 mm and more preferably 0.1–20 mm and a numerical aperture of 0–60%, may be interposed between the jig and a laminate of carbon fibers.

For example, for the production of a plate-shaped carbonaceous preform, a laminate of fabrics is pinched and pressed by two plate-like jigs, wherein the space between the two jigs can be adjusted so that a desired volume content of the carbon fibers in the preform is obtained.

The construction of the jig may be chosen from a single-stage construction and a multiple-stage construction, depending on the requirement. For example, use of three plate-like jigs as a set provides two carbonaceous preforms per one set of jigs, while use of five plate-like jigs as a set provides four carbonaceous preforms per one set of jigs.

In this case, if use is made of a pitch-based carbon fiber having an elastic modulus in the range of 100 to 700 GPa and of a carbonaceous pitch having a softening point in the range of 40 to 400° C. as a pitch which becomes a precursor of the matrix for the primary-formed product, the space between the two plate-like jigs is determined as follows:

$$d = cwsv + 2p \qquad (1)$$

where d is the space (mm) between two plate-like jigs, and c is a coefficient having a value of $1.2–1.6 \times 10^{-5}$ and preferably a value of 1.3–1.5 ×10$^{-5}$. The coefficient c varies depending on such factors as types of the filaments and orientation methods of the carbon fibers and is empirically determined according to materials. The symbol w stands for METSUKE, a real fiber weight (mass per unit, g/m$^2$), which is usually in the range of 30 to 5,000 and preferably in the range of 50 to 500. The symbol s stands for the number of sheets of stacked fabrics for lamination. The symbol v stands for the volume content (%) of the carbon fibers in the primary-formed product, which content is usually in the range of 5 to 80% and preferably in the range of 20 to 75%. The symbol p stands for the thickness (mm) of a plate to be interposed between the jig and the reinforcing fiber and is usually in the range of 0 to 20 mm, preferably in the range of 0.1 to 20 mm and most preferably in the range of 0.1 to 10 mm.

In the present invention, a carbonaceous preform is prepared by a process comprising fixing a laminate of the above-mentioned carbon fibers with a jig in the absence of a binder, impregnating the thus-fixed laminate of carbon fibers with a pitch, and then carbonizing the impregnated laminate in a non-oxidative gas atmosphere.

The "pitch" as referred to herein indicates a carbonaceous pitch derived from petroleum, coal or synthesis, having a softening point of 40 to 400° C., preferably 50 to 250° C. Both optically isotropic and anisotropic pitches are employable.

The ratios of hydrogen to carbon atom in the pitch is usually below 1.60 and preferably below 1.40.

The impregnation is effected by wetting the entirety of the jig-fixed laminate of carbon fibers with a molten pitch.

Then, usually a plurality of the thus-impregnated laminates of carbon fibers, which are fixed with jigs, are placed in a heating oven to carbonize the impregnated carbon fibers. The pitch, which is impregnated into the carbon fibers, solidifies in a span of time after impregnation and before being placed in the heating oven.

The carbonizing treatment is performed at a temperature in the range of 500 to 2,800° C., preferably 500 to 2,500° C., and more preferably 550 to 1,000° C. If the temperature is lower than the above-mentioned range, the effect of the carbonization may not be fully exhibited. The heating rate is in the range of 1° C./hour to 1,000° C. /minute and preferably in the range of 2° C./hour to 100° C./minute.

Usually, the carbonization is performed under a normal pressure or by isostatic pressing. The pressure to be adopted in the pressurized carbonization is above the atmospheric pressure and usually less than 2,000 kgf/cm$^2$, preferably in the range of 2 kgf/cm$^2$ to 1,000 kgf/cm$^2$, and more preferably 2 kgf/cm$^2$ to 10 kgf/cm$^2$.

If the pressure is lower than the above-described range, the carbonization yield is reduced, whereas, even if the pressure exceeds the above-described range, no remarkable further increase in the carbonization yield is observed and the apparatus becomes very costly.

Preferably, the pressure is set to a predetermined value from the start of the carbonization. This is because, if a method is adopted wherein the atmospheric gas pressure at the start of the carbonization is set to a value lower than a predetermined value so that the predetermined pressure is attained by utilizing the expansion in volume of the gas inside the oven as the temperature rises, the component having a low molecular weight in the pitch will start vaporization or decomposition before the predetermined pressure is attained.

The atmospheric gas to be used for the pressurization is not specially limited, if it is non-oxidative. Usually, nitrogen or argon is used as the gas. The volume content of the carbon fibers in the resulting carbonaceous preform is determined by the required properties of the desired composite, but usually it is in the range of 5 to 95%, preferably 10 to 80%, more preferably 20 to 75% and most preferably 30 to 70%.

The volume content of the carbon fibers can be adjusted by a carbon fiber laminating method and the space between the jigs.

The volume content of the matrix in the resulting carbonaceous preform varies depending on the kinds of pitch and carbonizing conditions to be adopted, but usually it is in the range of 5 to 95%, preferably 5 to 80%, more preferably 5 to 70% and most preferably 15 to 50%.

A carbonaceous preform is prepared in the above-described manner. In this case, if necessary, the density of the carbonaceous preform can be further enhanced by a densifying treatment and the characteristics of the carbonaceous preform can be improved by conducting a carbonizing treatment or a carbonizing and graphitizing treatment under a normal pressure.

After the carbonizing treatment, the jigs are removed and preferably the jigs are re-used.

The carbonaceous preform obtained by the present invention can be used as a starting material for the production of a carbon fiber reinforced carbonaceous composite or can be fabricated to be used in such applications as components of brakes, heat resisting materials and materials for aeronautic and space machinery.

The present invention makes it possible to use a pitch-based matrix for the production of a carbonaceous preform which is free from such drawbacks as delamination and is superior in formability and mass productivity.

The following examples are given to illustrate the present invention more concretely, but it is to be understood that the invention is not limited thereto.

EXAMPLE 1

Using a pitch-based carbon fiber having an elastic modulus of 350 GPa, a plain-weave fabric having a density of 360 g/m$^2$ was prepared. Then, a laminate of 150 stacked sheets of the obtained fabric was sandwiched between upper and lower perforated SUS plates each having a thickness of 10 mm, ends of which were fixed to each other with bolts and nuts so that a volume content of carbon fibers of 60% was obtained. In this case, applying the equation: d=cwsv, where c was given a value of 1.35×10$^{-5}$, the space d, i.e., the space between the jigs, was set to 44 mm.

The laminate was impregnated with a molten carbonaceous pitch having a softening point of 100° C. under a reduced pressure, and the impregnated laminate was placed in an oven having a nitrogen gas atmosphere, where the temperature was raised to 1,000° C. in about 4 hours, to obtain a carbonaceous preform having a thickness of 44 mm and a volume content of carbon fibers of 60%.

EXAMPLE 2

Using a pitch-based carbon fiber having an elastic modulus of 350 GPa, a plain-weave fabric having a density of 300 g/m$^2$ was prepared. Then, laminate of 100 stacked sheets of the obtained fabric was sandwiched between upper and lower SUS wire meshes each having a thickness of 1 mm and was additionally sandwiched between upper and lower perforated SUS plates each having a thickness of 10 mm, ends of which were fixed to each other with bolts and nuts so that a volume content of carbon fibers of 50% was obtained. In this case, applying the equation: d=cwsv +2p, where c was given a value of $1.3 \times 10^{-5}$, the space d, i.e., the space between the jigs, was set to 22 mm.

The laminate was impregnated with a molten carbonaceous pitch having a softening point of 100° C. under a reduced pressure, and the impregnated laminate was placed in an oven having a nitrogen gas atmosphere, where the temperature was raised to 1,000° C. in about 4 hours, to obtain a carbonaceous preform having a thickness of 19.5 mm and a volume content of carbon fibers of 50%.

EXAMPLE 3

Using a pitch-based carbon fiber having an elastic modulus of 400 GPa, a plain-weave fabric having a density of 300 g/m² was prepared. Then, 100 sheets of the obtained fabric were stacked at 0°/45°/45°/0° to one another to form a laminate having an in-plane pseudo-isotropy. The laminate was sandwiched between upper and lower SUS wire meshes each having a thickness of 1 mm and was additionally sandwiched between upper and lower perforated SUS plates each having a thickness of 10 mm, ends of which were fixed to each other with bolts and nuts so that a volume content of carbon fibers of 40% was obtained. In this case, applying the equation: d=cwsv+2p, where c was given a value of $1.4 \times 10^{-5}$, the space d, i.e., the space between the jgs, was set to 19 mm.

The laminate was impregnated with a molten carbonaceous pitch having a softening point of 100° C. under a reduced pressure, and the impregnated laminate was placed in an oven having a nitrogen gas atmosphere at a pressure of 10 kgf/cm², where the temperature was raised to 1,000° C. in about 4 hours, to obtain a carbonaceous preform having a thickness of 16.8 mm and a volume content of carbon fibers of 40%.

EXAMPLE 4

Using a pitch-based carbon fiber having an elastic modulus of 200 GPa, a spiral-weave fabric having a density of 330 g/m² was prepared. The fabric spiral was cut to a length equivalent to the thickness of a laminate of 100 sheets of fabric. The upright fabric spiral was sandwiched between upper and lower SUS wire meshes each having a thickness of 1 mm and was additionally sandwiched between upper and lower perforated SUS plates each having a thickness of 10 mm, ends of which were fixed to each other with bolts and nuts so that a volume content of carbon fibers of 45% was obtained. In this case, applying the equation: d=cwsv+2p, where c was given a value of $1.4 \times 10^{-5}$, the space d, i.e., the space between the jigs, was set to 23 mm.

The thus-fixed fabric was impregnated with a molten carbonaceous pitch having a softening point of 100° C. under a reduced pressure, and the impregnated fabric was placed in an oven having a nitrogen gas atmosphere, where the temperature was raised to 1,000° C. in about 4 hours, to obtain a carbonaceous preform having a thickness of 20.6 mm and a volume content of carbon fibers of 45%.

EXAMPLE 5

Pitch-based carbon filaments each 7 µm in diameter having an elastic modulus of 100 GPa were brought into a unidirectional array, ends of which were fixed by means of a tape to prepared a sheet having a density of 650g/m². Then, a laminate of 112 sheets obtained in the above-described manner was sandwiched between upper and lower perforated SUS plates each having a thickness of 10 mm, ends of which were fixed to each other with bolts and nuts so that a volume content of carbon fibers of 60% was obtained. In this case, applying the equation: d=cwsv+2p, where c was given a value of $1.5 \times 10^{-5}$ the space d, i.e., the space between the jigs, was set to 65 mm.

The laminate was impregnated with a molten carbonaceous pitch having a softening point of 100° C. under a reduced pressure, and the impregnated laminate was placed in an oven having a pressurized argon gas atmosphere, where the temperature was raised to 800° C. in about 4 hours, to obtain a primary-formed product as a unidirectional carbon fiber composite having a thickness of 65 mm and a volume content of carbon fibers of 60%.

What is claimed is:

1. A process for producing a carbonaceous preform, comprising the steps of fixing a laminate of stacked carbon fibers with a fixing jig in the absence of a binder, the fixing jig comprising two plates and a fixing means, wherein the two plates are spaced at a pre-determined distance apart, and wherein the space between the two plates can be adjusted to obtain a desired volume content of the carbon fibers;

impregnating the thus-fixed laminate with a molten carbonaceous pitch; and carbonizing the impregnated laminate at a heating rate of 1° C./hour–1,000 ° C./ minute and at a normal pressure or by isotactic pressing, under a non-oxidative gas atmosphere, wherein the plates are maintained at the pre-determined distance during the impregnating and carbonizing steps.

2. A process according to claim 1, wherein the laminate of stacked carbon fibers is a laminate of a plurality of carbon fiber fabrics.

3. A process according to claim 1, wherein the two plates are stainless steel plates.

4. A process according to claim 3, wherein the carbonization is performed at 500–1,000° C.

5. A process according to claim 4, wherein the space between the two plates is defined in accordance with the formula $$d = cwsv + 2P$$

where d is the space (mm) between the two plates, c is a coefficient having a value of $1.2–1.6 \times 10^{-5}$, w is a METSUKE of 30–5,000 g/m², s is the number of stacked fabrics for lamination, v is a volume content of 5–80% and p is the thickness of a plate of 0.1–20 mm, and a pitch having a softening point of 40–400° C. is impregnated.

6. A process according to claim 5, wherein the pitch has the ratio of hydrogen to carbon atom of less than 1.60.

7. A process according to claim 6, wherein the carbonization is performed at a pressure of an atmospheric pressure-2,000 kg/cm².

8. A process according to claim 7 the volume content of the matrix in the carbonaceous preform is 5–95%.

9. A process according to claim 1, wherein the space between the two plates is defined in accordance with the formula $$d = cwsv + 2P$$

where d is the space (mm) between the two plates, c is a coefficient having a value of $1.2–1.6 \times 10^{-5}$, w is a METSUKE of 30–5,000 g/m², s is the number of stacked fabrics for lamination, v is a volume content of the carbon fibers in the carbonaceous preform of 5–80% and p is the thickness of a plate of 0.1–20 mm, and a pitch having a softening point of 40–400° C. is impregnated.

10. A process according to claim 9, wherein the pitch has the ratio of hydrogen to carbon atom of less than 1.60.

11. A process according to claim 10, wherein the carbonization is performed at a pressure of an atmospheric pressure-2,000 kg/cm$^2$.

12. A process according to claim 11, wherein the volume content of the matrix in the carbonaceous preform is 5–95%.

* * * * *